United States Patent
Tschannen et al.

(10) Patent No.: US 11,856,203 B1
(45) Date of Patent: Dec. 26, 2023

(54) NEURAL FACE VIDEO COMPRESSION USING MULTIPLE VIEWS

(71) Applicant: Apple Inc., Cupertino, CA (US)

(72) Inventors: Michael Tschannen, Zurich (CH); Ali Benlalah, Dietikon (CH); Anna Volokitin, Zurich (CH); Brian Amberg, Zollikon (CH); Sebastian Martin, Schwerzenbach (CH); Stefan Brugger, Sissach (CH)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/701,498

(22) Filed: Mar. 22, 2022

(51) Int. Cl.
*H04N 19/139* (2014.01)
*H04N 19/132* (2014.01)
*H04N 19/42* (2014.01)

(52) U.S. Cl.
CPC ......... *H04N 19/139* (2014.11); *H04N 19/132* (2014.11); *H04N 19/42* (2014.11)

(58) Field of Classification Search
CPC ..... H04N 19/139; H04N 19/132; H04N 19/42
See application file for complete search history.

(56) References Cited

U.S. PATENT DOCUMENTS

| | | | | |
|---|---|---|---|---|
| 2021/0012126 | A1* | 1/2021 | Porta | B60H 1/00742 |
| 2021/0124985 | A1* | 4/2021 | Ren | G06V 30/248 |
| 2021/0237764 | A1* | 8/2021 | Tang | G06V 10/462 |
| 2022/0103860 | A1* | 3/2022 | Demyanov | H04N 19/42 |
| 2022/0148241 | A1* | 5/2022 | Park | G06N 3/047 |
| 2022/0156893 | A1* | 5/2022 | Zhou | G06T 5/005 |

OTHER PUBLICATIONS

Wang et al., "One-Shot Free-View Neural Talking-Head Synthesis for Video Conferencing," NVIDIA Corporation, Xiv:201 1.15126v3 [cs.CV] Apr. 2, 2021.*
Wang et al., "One-Shot Free-View Neural Talking-Head Synthesis for Video Conferencing," NVIDIA Corporation, arXiv:2011.15126v3 [cs.CV] Apr. 2, 2021.

* cited by examiner

*Primary Examiner* — Mohammed S Rahaman
(74) *Attorney, Agent, or Firm* — Blank Rome LLP (57) ABSTRACT

Advances in deep generative models (DGM) have led to the development of neural face video compression codecs that are capable of using an order of magnitude less data than "traditional" engineered codecs. These "neural" codecs can reconstruct a target image by warping a source image to approximate the content of the target image and using a DGM to compensate for imperfections in the warped source image. The determined warping operation may be encoded and transmitted using less data (e.g., transmitting a small number of keypoints, rather than a dense flow field), leading to the bandwidth savings compared to traditional codecs. However, by relying on a single source image only, these methods can lead to inaccurate reconstructions. The techniques presented herein improve image reconstruction quality while maintaining bandwidth savings, via a combination of using multiple source images (i.e., containing multiple views of the first human subject) and novel feature aggregation techniques.

20 Claims, 8 Drawing Sheets

DETERMINE, FOR EACH OF THE FIRST PLURALITY OF SOURCE IMAGES, A FIRST SET OF MOTION VECTORS, WHEREIN THE FIRST SET OF MOTION VECTORS DEFINE A PREDICTED MOTION BETWEEN THE RESPECTIVE SOURCE IMAGE AND THE FIRST TARGET IMAGE — 310

DETERMINE A PREDICTED MOTION BETWEEN THE DETERMINED SET OF SOURCE IMAGE KEYPOINTS FOR THE RESPECTIVE SOURCE IMAGE AND THE RECEIVED SET OF TARGET IMAGE KEYPOINTS FOR THE FIRST TARGET IMAGE — 340

PREDICT AN OCCLUSION MAP FOR EACH OF THE FIRST PLURALITY OF SOURCE IMAGES WITH RESPECT TO THE FIRST TARGET IMAGE — 342

NEURAL FACE VIDEO COMPRESSION USING MULTIPLE VIEWS

TECHNICAL FIELD

This disclosure relates generally to the fields of digital image processing and video compression. More particularly, but not by way of limitation, it relates to multi-image neural video compression techniques for achieving high compression rates while maintaining image quality.

BACKGROUND

The advent of mobile, multi-function devices, such as smartphones and tablet devices, has resulted in a desire for small form factor cameras capable of generating high levels of image quality for integration into such mobile, multi-function devices. Increasingly, as users rely on these multi-function devices as their primary video capture and video-conferencing devices for day-to-day usage, the need for improved video compression techniques—while maintaining image quality levels that users have become accustomed to—has become an increasingly important challenge to solve.

In a typical videoconferencing application, a significant amount of bandwidth is used to facilitate data transfer between communicating devices. The amount of bandwidth required depends on the quality of the video and audio, as well as other factors, such as the method of encoding the video content. However, access to a data connection with high bandwidth is not always possible. In such circumstances, a drop in available bandwidth may result in loss of connection or poor image quality.

Advances in deep generative models (DGM) have led to the development of neural face video compression codecs that are capable of using an order of magnitude less data bandwidth than "traditional" engineered codecs. These "neural" codecs can reconstruct a target image (e.g., an image containing a depiction of a first human subject that is captured as part of a videoconferencing application) by warping a source image (e.g., an image containing a different view of the first human subject) to approximate the target image content and using a DGM to compensate for imperfections in the warped source image.

The determined warping operations may then be encoded and transmitted using less data (e.g., by being transmitted via a small number of keypoints, rather than a dense flow field), leading to the bandwidth savings compared to traditional codecs. However, by relying on a single source image only (i.e., which only contains a single view of the first human subject), these methods can lead to inaccurate image reconstructions at the receiving device. Thus, the techniques presented herein help to improve image reconstruction quality while maintaining bandwidth savings, via a combination of using multiple source images (i.e., containing multiple views of the first human subject) and novel feature aggregation techniques.

SUMMARY

Devices, methods, and non-transitory computer readable media are disclosed herein to perform multi-image neural video compression and reconstruction techniques.

In one embodiment, a method is described, comprising: receiving, at a first receiving device and from a first sending device, a first plurality of source images of a first subject (e.g., wherein each source image comprises a distinct view of the first subject); receiving, from the first sending device, a set of target image keypoints for a first target image of the first subject; determining, using a keypoint detector (e.g., an end-to-end trained keypoint detector neural network), a set of source image keypoints for each of the first plurality of source images of the first subject; and determining, using an encoder network, a feature space representation of each of the first plurality of source images.

The method may further comprise: determining, for each of the first plurality of source images, a first set of motion vectors, wherein the first set of motion vectors define a predicted motion between the respective source image and the first target image (e.g., wherein the motion vectors may be derived from the respective image keypoints of the source image and target image); and then determining, for each of the first plurality of source images, a first set of warping operations, wherein the first set of warping operations for each source image are determined based on the first set of motion vectors determined for the respective source image.

The method may then proceed by: applying each determined first set of warping operations to the determined feature space representation of the respective image of the first plurality of source images to generate a first set of warped source image features; aggregating the first set of warped source image features to generate a first set of aggregated features for the first target image (e.g., using pooling mechanisms and/or self-attention mechanisms); and generating (e.g., using a DGM) a reconstructed version of the first target image based on the first set of aggregated features.

In some embodiments, portions of the multi-image neural compression method may be iteratively repeated on subsequently-obtained target images without the need to re-process they already-received and characterized plurality of source images. That is, the method may be configured to further: receive, from the first sending device, a set of target image keypoints for a second (i.e., subsequent) target image of the first subject; determine, for each of the first plurality of source images, a second set of motion vectors, wherein the second set of motion vectors define a predicted motion between the respective source image and the second target image; determine, for each of the first plurality of source images, a second set of warping operations, wherein the second set of warping operations for each source image are determined based on the second set of motion vectors determined for the respective source image; apply each determined second set of warping operations to the determined feature space representation of the respective image of the first plurality of source images to generate a second set of warped source image features; aggregate the second set of warped source image features to generate a second set of aggregated features for the second target image; and generate a reconstructed version of the second target image based on the second set of aggregated features.

According to some embodiments, determining the first set of motion vectors may further comprise determining a predicted motion between the determined set of source image keypoints for the respective source image and the received set of target image keypoints for the first target image (i.e., rather than determining an entire dense optical flow field for the image, which could be more computationally expensive). As will be explained herein, according to some embodiments, the image keypoints represent a concise approximation of a dense optical flow field for the image, and thus the information that needs to be transmitted to the receiving device for each target image remains small. According to still other embodiments, determining the first set of motion vectors may further comprise predicting an occlusion map for each of the first plurality of source images with respect to the first target image.

In some embodiments, the method may receive, at the first receiving device and from the first sending device, a first updated source image of the first subject; determine, using the keypoint detector, a set of source image keypoints for the first updated source image of the first subject; and then determine, using the encoder network, a feature space representation of the first updated source image. In some implementations, the first updated source image may be used to replace one image in the first plurality of source images, while, in other implementations, the updated source image may be added to the first plurality of source images. In some embodiments, the first updated source image of the first subject may be determined at the first sending device as a result of a random sampling (RS) operation or a furthest point sampling (FPS) operation (which operations will be described in further detail below) applied across a batch or stream of images captured at the first sending device.

In yet another embodiment, a method to be performed at a first sending device is described, comprising: obtaining, at the first sending device, a first plurality of source images of a first subject, wherein each image of the first plurality of source images comprises a distinct view of the first subject; transmitting, from the first sending device to a first receiving device, the first plurality of source images of the first subject; obtaining, at the first sending device, a first target image of the first subject; determining, using an end-to-end trained keypoint detector neural network at the first sending device, a first set of target image keypoints for the first target image of the first subject; transmitting, from the first sending device to the first receiving device, as part of a videoconferencing application, the first set of target image keypoints; obtaining, at the first sending device, a second target image of the first subject; determining, using the end-to-end trained keypoint detector neural network at the first sending device, a second set of target image keypoints for the second target image of the first subject; and transmitting, from the first sending device to the first receiving device, as part of the videoconferencing application, the second set of target image keypoints. In some such embodiments, the method may also be capable of determining, at the first sending device, that there is a need to obtain a first updated source image of the first subject and then transmitting, from the first sending device to the first receiving device, the first updated source image of the first subject.

Various non-transitory computer readable media embodiments are disclosed herein. Such computer readable media are readable by one or more processors. Instructions may be stored on the computer readable media for causing the one or more processors to perform any of the techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

So-called "neural" image and video compression research (i.e., compression techniques that leverage the use of neural networks and other machine learning concepts) has made great strides over the past few years. In particular, the latest models leverage advances in deep generative modeling to produce neural compression models that can outperform their state-of-the-art engineered codec counterparts by significant margins in rate-distortion performance when taking human perceptual quality into account. Even larger compression gains can be achieved by learning a domain-specific compression model, i.e., for use cases wherein the data domain is constrained to a particular application.

Designing and training compression models specific to videoconferencing calls (e.g., videoconferencing calls with a well-framed, relatively stationary, single human subject and a stable scene background) is one of the most recent domains to have been investigated, with some works reporting an order of magnitude of rate reduction at given perceptual quality compared to engineered codecs. Essentially, these single-face view neural video compression algorithms rely on a single source image (i.e., "view") of the face of the subject, warp this view to approximate the target image that is to be transmitted to a receiving device, and process the warped source image (or features extracted from the source image) with a generator to compensate for imperfections in the warped source image. By parameterizing the warping operation using a relatively small set of keypoints or local affine transforms, e.g., as extracted from the target image using a corresponding learned keypoint predictor, a highly-efficient coding and transmission of the warping operation is possible.

While some such single-image neural compression models may achieve good perceptual rate distortion performance, they also have some clear limitations, e.g., due to solely relying on single source image view of the subject. Indeed, a single view might not provide appearance details about one side of the face, e.g., if the subject's head in the source image is slightly rotated to the left or right. Similarly, a source image view showing the subject's face with a closed mouth does not provide any information about the appearance of the mouth's interior. More generally, it is usually impossible to faithfully infer subject-specific shape and appearance details for different facial expressions by solely relying on a single image view of the subject's face.

Thus, described herein are various neural image compression techniques that leverage having multiple views of a subject's face to develop improved neural face video compression algorithms and schemes. Specifically, by intelligently selecting different views of the subject to use as the source images and learning how to best fuse (or "aggregate") the image information that is stored in features from the various different source image views of the subject, further improvements to neural image compression processing may be achieved.

Multi-Image Neural Compression Systems

Figure 1:
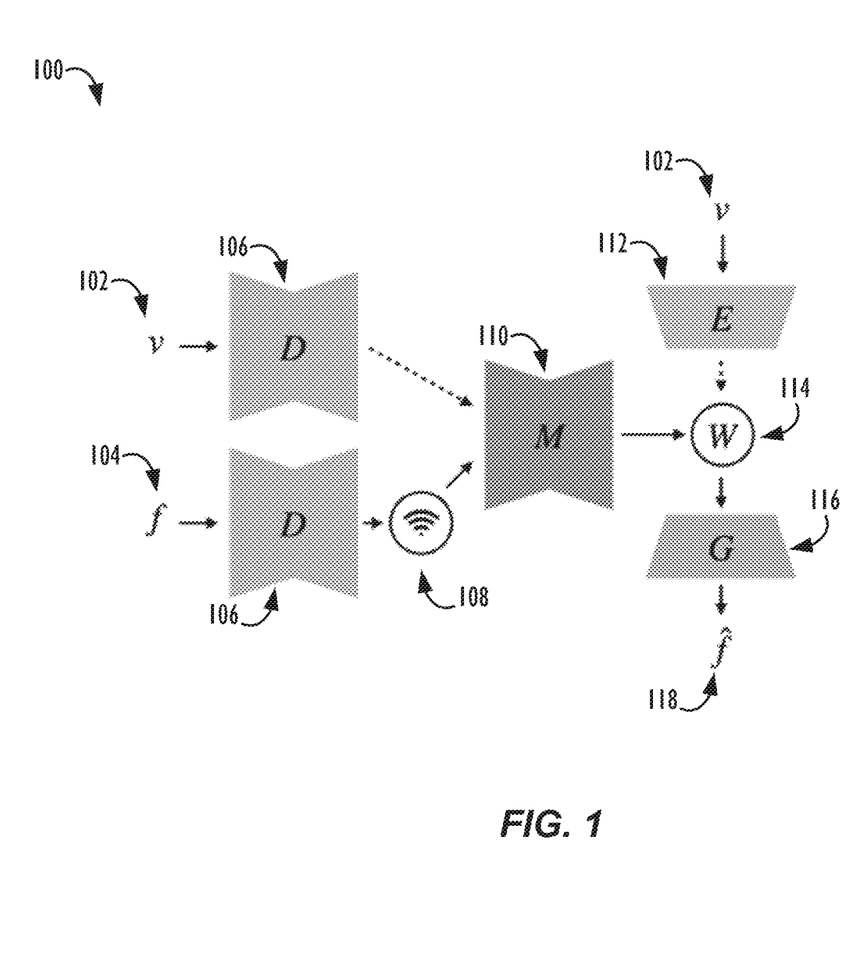
FIG. 1 illustrates an exemplary single-image neural video compression model.

Turning now to FIG. 1, an exemplary single-image neural video compression model 100 is illustrated. The exemplary single-image neural video compression model 100 may also be referred to herein as a first order motion model (FOMM). Model 100 may comprise a keypoint detector D (106), a dense motion predictor M (110), a generator G (116), and a corresponding encoder E (112).

Given a target image f (104) and a source image v (102), the model 100 may first extract a set of sparse keypoints (e.g., 10-20 keypoints) using keypoint detector D (106) and determine the corresponding local affine transformations from f and v, which together define a coarse flow field. The keypoints and affine transformations may then be processed with dense motion predictor M (110), which refines the coarse flow field and may also predict an occlusion map, wherein the occlusion map indicates areas of the source image v (102) where it is predicted that source image v (102) does not have corresponding image content to the target image f (104) (or where it is predicted that the approximation of f (104) after warping v (102) is inaccurate, for any other reason). Finally, the flow field produced by dense motion predictor M (110) may be used to warp W (114) the features extracted from source image v (102) by encoder E (112), mask them out in the appropriate areas of the feature space representation of the image using the predicted occlusion map, and then reconstruct a version of target image f (104) with the generator G (116), wherein the reconstructed version of the target image is denoted in FIG. 1 as reconstructed target image, f̂ (118).

It should be noted that the keypoint detector D (106) and the encoder E (112) only have to applied once to a given source image v (102). For example, according to some videoconferencing embodiments, a source image v (102) may be transmitted to a receiving device first, determining its feature space representation using an encoder E (112) once upon arrival at the receiving device and all subsequently-captured target image frames f (104) may be encoded and transmitted (108) via their corresponding target image keypoints and/or affine transformations. Thus, the transmission cost of the single source image v (102) may be amortized across the duration of the entire videoconferencing call.

Figure 2:
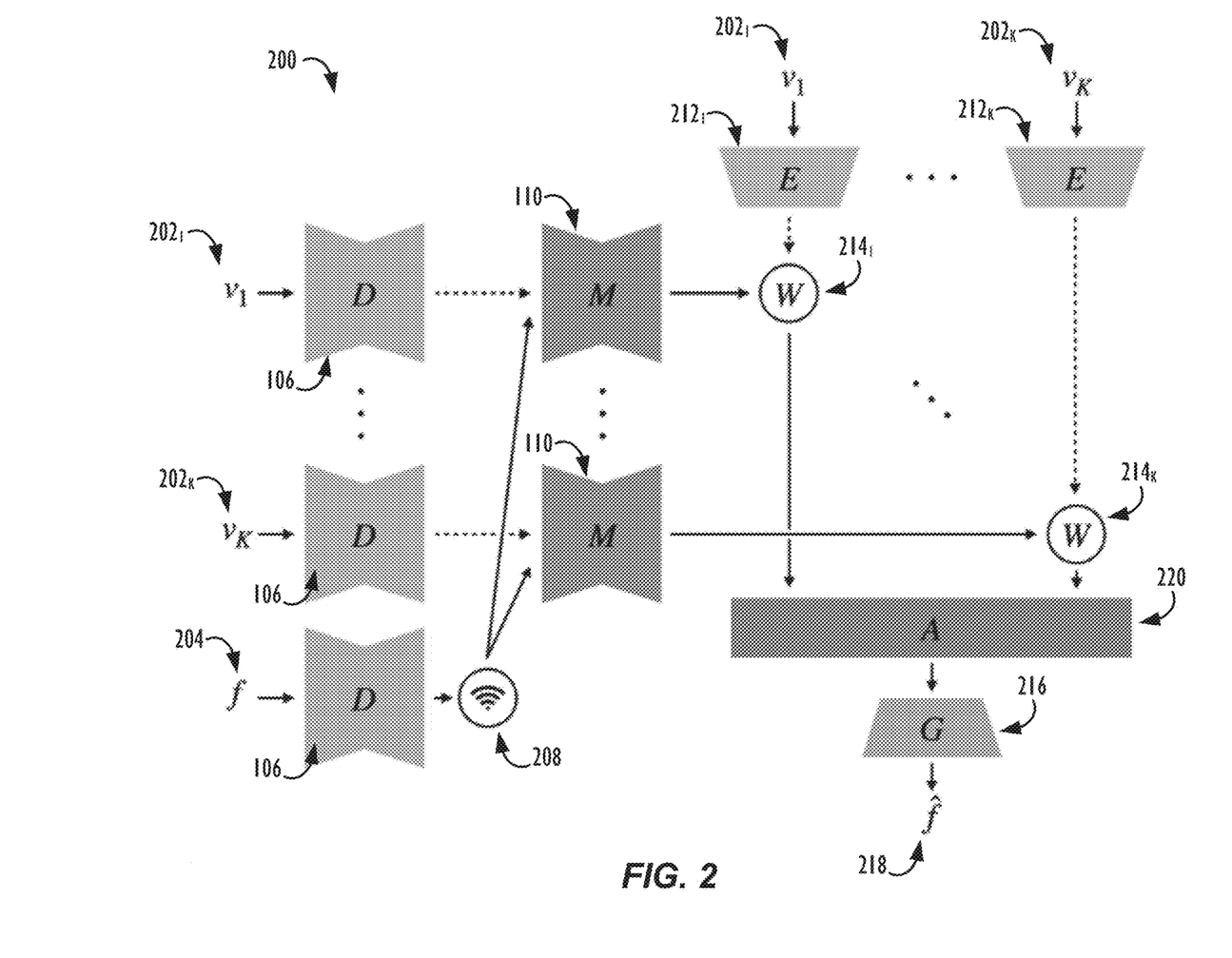
FIG. 2 illustrates an exemplary multi-image neural video compression model, according to one or more embodiments.

Turning now to FIG. 2, an exemplary multi-image neural video compression model 200, according to one or more embodiments. To extend the FOMM model 100 shown in FIG. 1 to work multiple source image views, e.g., k different source image views (202) denoted $\{v_1 .. v_K\}$ in FIG. 2, the keypoint detector D (106) may be applied to every source image view from $v_1$ ($202_1$) through $v_K$ ($202_K$), in order to obtain a corresponding coarse flow for every source image view (202), which may be subsequently refined by applying the dense motion predictor M (110) to every coarse flow field.

As described above with reference to FIG. 1, the flow fields produced by dense motion predictor M (110) for each source image view ($202_K$) may be used to warp W ($214_K$) the features extracted from each corresponding source image $v_K$ ($202_K$) by encoder E ($212_K$), again subject to masking out any features according to a predicted occlusion map. However, rather than reconstructing a version of target image f (204) with the generator G (216) at this stage, exemplary multi-image neural video compression model 200 may first pass the obtained warped and masked features for each of the source image views to an aggregation module A (220), which will be discussed in more detail below. The output of aggregation module A (220) may then be fed to the generator G (216) to reconstruct the target frame, which is denoted in FIG. 2 as reconstructed target image, f̂ (218).

As with model 100 described above in FIG. 1, it should be noted that the keypoint detector D (106) and the encoder E ($212_K$) only have to applied once to each given source image $v_K$ ($202_K$). For example, according to some multi-image neural compression videoconferencing embodiments, three source images (e.g., $202_1$, 2022, and 2023) may be transmitted to a receiving device first, and all subsequently-captured target image frames f (204) may be transmitted (208) via their corresponding target image keypoints. Thus, the transmission cost of a small number, e.g., three, source images v (202) may be amortized across the duration of the entire videoconferencing call. While the number of source images used may vary for a given implementation, it has been determined that, using a larger number of source images may provide better reconstruction results if there is not much variation in the content of the captured video sequence that is being transmitted, but may not generalize well in situations where the content of the captured video sequence differs significantly from those in the source image views. Thus, an appropriate balance may be found for the needs of any given implementation. Moreover, when using multiple source image views, it has been determined that also predicting local affine transformations does not significantly improve performance, so even further bandwidth savings may be realized by transmitting keypoints for the target images only.

Aggregation Module

Preferably, the source image view aggregation module (220) should have two properties: 1) it should be invariant to the order in which the source image views are aggregated; and 2) it should be able to aggregate features from a changing number of views, e.g., as more source image views may arrive over time, such as over the duration of a videoconference call. Indeed, having diverse source image views of the captured subject with complementary information, which will often only become available over time, e.g., as the subject moves their head around and shows different facial expressions, can improve the quality and accuracy of the target image reconstruction efforts.

According to a first embodiment, then, the view aggregation module (220) may utilize permutation-invariant pooling techniques, such as max pooling and/or average pooling operations. In order facilitate the fusion of the features, a stack of the same two residual block may be applied to the features extracted from every source image view after warping/masking, and then the features may be pooled across the source image views.

According to a second embodiment, the view aggregation module (220) may utilize a self-attention mechanism, i.e., as between identical spatial locations in feature space, across the source image views. In more detail, let $z_{i,j}^{(k)} \in \mathbb{R}^c$ be the feature extracted from source image view k after warping and masking at spatial location (i, i), and let $Z_{i,j} = [z_{i,j}^{(1)}, \ldots, z_{i,j}^{(K)}]T \in \mathbb{R}^{K \times c}$ be the matrix obtained by stacking the $z_{i,j}^{(k)}$.

The second embodiment may then obtain query (Q), key (K), and value (V) matrices, represented as: $Q_{i,j}=Z_{i,j}W_q$, $K_{i,j}=Z_{i,j}W_k$, and $V_{i,j}=Z_{i,j}W_v$, respectively, where $W_q$, $W_k \in \mathbb{R}^{c \times d}$ and $W_v \in \mathbb{R}^{c \times c}$. Every key vector has an associated value vector, which can be queried using a query vector, e.g., via the attention mechanism. This approximates reading out a value from a classical dictionary data structure. In other words, the value matrix holds a collection of value vectors. The self-attention output at spatial location (i,j) in feature space, for all K views, may then be computed as:

$$A_{i,j} = \mathrm{softmax}(Q_{i,j} K_{i,j}^T / \sqrt{d}) V_{i,j} \qquad \text{(Eqn. 1).}$$

Note that computing $Q_{i,j}$, $K_{i,j}$, and $V_{i,j}$ over all spatial locations amounts to a 1×1 convolution. To build a self-attention block, a residual branch may be added to the self-attention output, a feature normalization operation (e.g., a channel normalization operation) may be applied, and then another 3×3 convolution layer may be applied (thereby maintaining the number of channels), followed by another feature normalization operation. Two or more such blocks (i.e., blocks comprising a self-attention mechanism, residual branches, normalization, and another 3×3 convolution) may be stacked, and then a convolution operation may be applied, thereby producing a W×H×K output, which may also be normalized along the channel dimension, e.g., using a softmax operation, to aggregate the $z_{i,j}^{(k)}$ across source image views using an average, with the softmax output serving as weights.

Source Image View Selection Strategies

Various source image sampling strategies may be employed at a sending device to identify and send a representative set of source image views to a receiving device, such that the receiving device is able to reconstruct a wide array of subject facial expressions and views with minimal image reconstruction error or artifacts. A first such sampling strategy is referred to herein as a "random sampling" or "RS" approach. RS amounts to picking the first source image view, as well as K-1 additional source image view frames at random among the remaining image frames in a given video image sequence.

A second such sampling strategy is referred to herein as a "furthest point sampling" or "FPS" approach, based on facial landmarks. In an FPS approach, first, 2D facial landmarks may be extracted from each image frame, e.g., using a simple and efficient landmark detector. Sampling may then be performed on the vectors obtained by stacking the 2D facial landmarks across the image frames, by selecting the first frame of the video image sequence, and then iteratively selecting the image frame from the video image sequence whose 2D facial landmark vector maximizes the minimal Euclidean distance to the 2D facial landmark vectors corresponding to the previously selected image frames from the video image sequence, thereby ensuring a variety of different source image views are selected.

It is to be understood that the above approaches to source image view selection may be performed on batches of already-captured video images (i.e., "per-video" sampling), but that real-time or so-called "online" source image view selection strategies may be necessary to enable real-time videoconferencing calls or other streaming video scenarios. As such, "online" RS and FPS can be realized using so-called "reservoir" sampling approaches, i.e., one-pass algorithms for sampling k records, without replacement (i.e., meaning that the final set of records has no duplicates, but that records can be replaced or swapped during the process), from a population of unknown size, n.

Exemplary Neural Compression Results Comparisons

Experimental results produced by the inventors have demonstrated that a multi-image neural compression model, such as those described herein, may, in many cases, produce a more accurate reconstruction of the facial expression and non-face parts (e.g., headwear, hands, etc.) of a subject appearing in a target image than prior art single-image neural compression model. For example, a single-frame compression model often struggles with accurate image reconstructions when the subject's hand (or other object or accessory) enters the target image frame, whereas the multi-image model is often able to approximately reconstruct the hand (or other object or accessory) of the human subject, e.g., due to having more widely-varying source image data to pull from when performing the image reconstruction. Further, traditional video codecs (e.g., H.264) may suffer from strong compression artifacts when operating at equivalent bit bandwidths to the multi-image neural compression models described herein, e.g., which compression artifacts may exhibit themselves as blocky and/or blurry patches of pixels around the face of the human subject in the captured target image.

Exemplary Multi-Image Neural Compression Methods

Figure 3A:
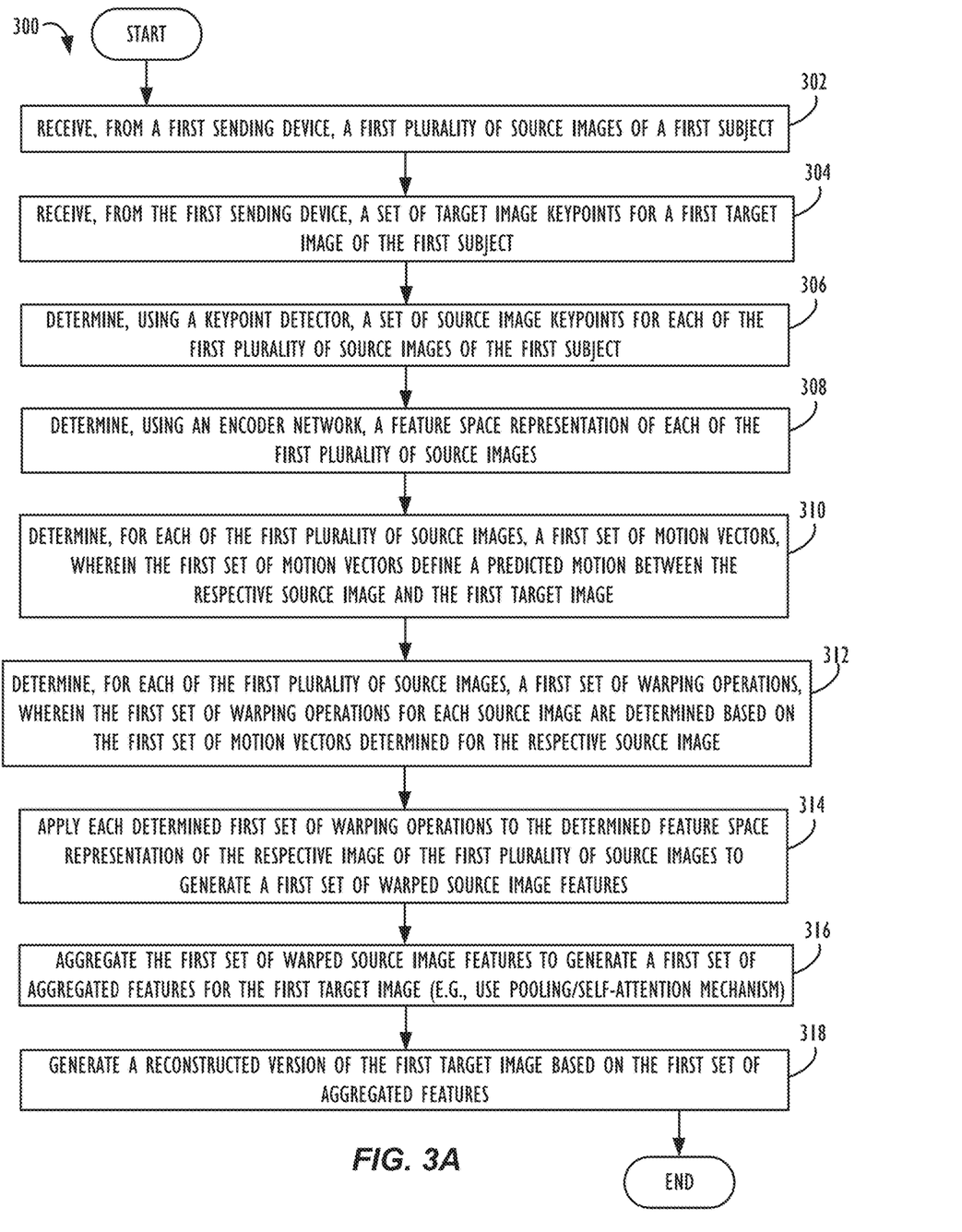
FIGS. 3A-3D are flow charts illustrating various methods of performing multi-image neural video compression and reconstruction at a receiving device, according to one or more embodiments.

Turning now to FIG. 3A, a flow chart illustrating a method 300 of performing multi-image neural video compression and reconstruction at a receiving device is shown, according to one or more embodiments. Method 300 may begin at Step 302 by an electronic device (e.g., referred to in the context of FIGS. 3A-3D as a "receiving device") receiving, from a first sending device, a first plurality of source images of a first subject. As described above, the first plurality of source images of a first subject may, in some instances, each comprise a distinct view of the first subject. For example, if the first plurality of source images comprises three images, the three images may comprise a frontal view, a left-side view, and a right-side view of the face of the first subject.

Next, at Step 304, the method 300 may proceed by receiving, from the first sending device, a set of target image keypoints for a first target image of the first subject. Next, at Step 306, the method 300 may proceed by determining, using a keypoint detector, a set of source image keypoints for each of the first plurality of source images of the first subject. In some embodiments, the keypoint detector may comprise an end-to-end trained keypoint detector neural network. Next, at Step 308, the method 300 may proceed by determining, using an encoder network, a feature space representation of each of the first plurality of source images.

Next, at Step 310, the method 300 may proceed by determining, for each of the first plurality of source images, a first set of motion vectors, wherein the first set of motion vectors define a predicted motion between the respective source image and the first target image. At Step 312, the method 300 may proceed by determining, for each of the first plurality of source images, a first set of warping operations, wherein the first set of warping operations for each source image are determined based on the first set of motion vectors determined for the respective source image. At Step 314, the method 300 may then proceed by applying each determined first set of warping operations to the determined feature space representation of the respective image of the first plurality of source images to generate a first set of warped source image features.

Next, at Step 316, the method 300 may proceed by aggregating the first set of warped source image features to generate a first set of aggregated features (e.g., as described above with respect to Aggregation Module 220) for the first target image. At Step 318, the method 300 may proceed by generating a reconstructed version of the first target image based on the first set of aggregated features (e.g., by a Deep Generative Model, such as generator 216, described above). In some embodiments, generator 216 may comprise a Generative Adversarial Network or GAN.

As may be understood, Steps 303/310/312/314/316/318 may be repeated for each subsequently-received target image of the first subject, e.g., each image that may be received as a part of a videoconferencing application or other video image stream. The sequence of reconstructed versions of the received target image keypoints then form the video stream that may be displayed and/or stored on the receiving device. By contrast, Steps 302/306/308 only have to be performed once for each received plurality of source images and then, as will be described in greater detail below, Steps 302/306/308 may be re-performed any subsequent time that the sending device (or receiving device) determines that additional new (or replacement) source images of the first subject should be sent to the receiving device, e.g., if new views or facial expressions of the first subject are sensed in the captured video feed that would help in the reconstruction of target images during the remainder of the video feed. In some implementations, new views or facial expressions may be detected at the sending device by determining that there has been greater than a threshold amount of change between the set of keypoints of a newly-captured image and the set of keypoints for any of the already-transmitted source images. In other words, such newly-captured image may represent a new facial expression, background or lighting composition, or facial/head angle that the subject had not yet exhibited during a current videoconferencing call.

Figure 3B:
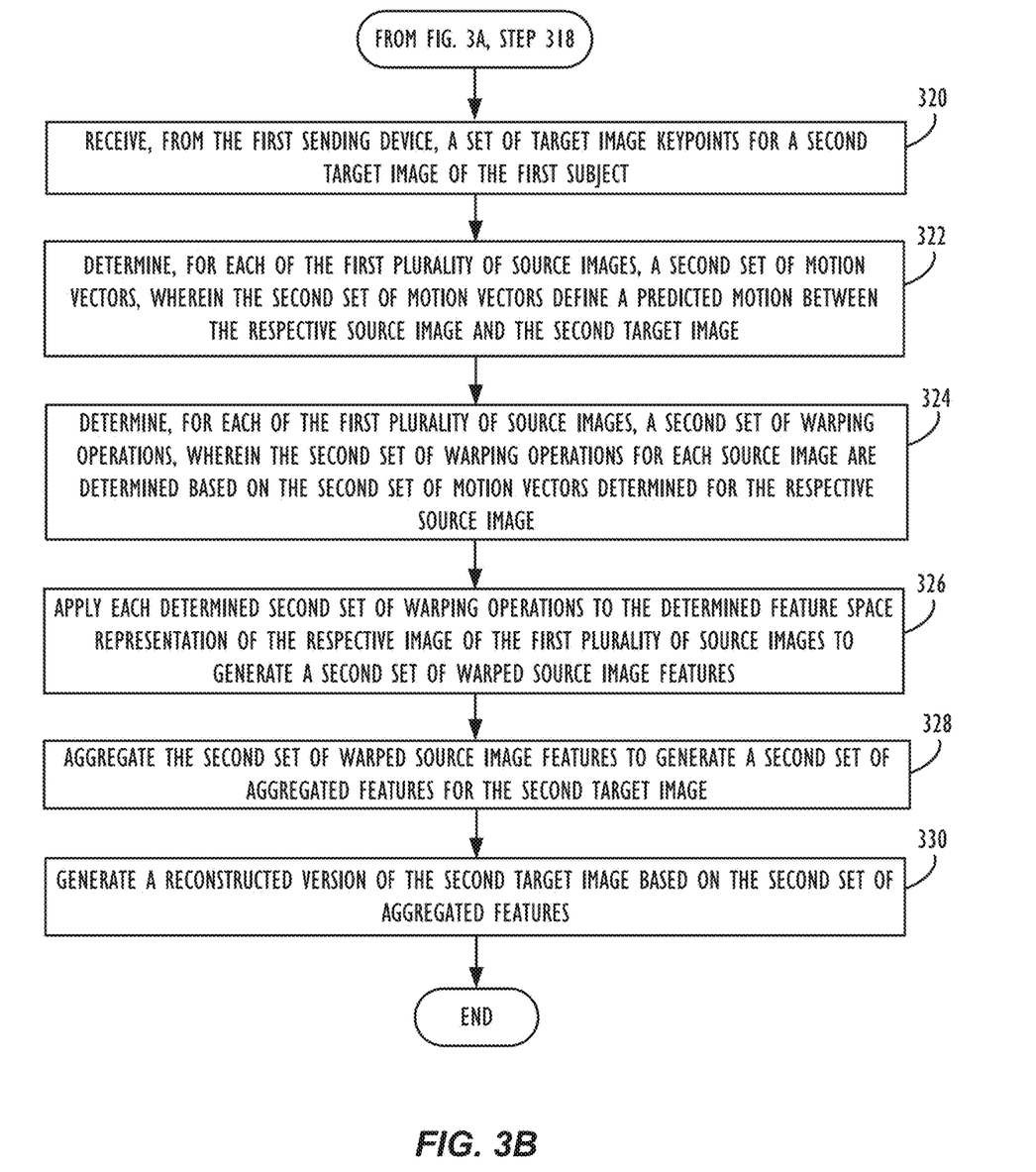

Referring now to FIG. 3B, a flow chart illustrating additional details for method 300 of performing multi-image neural video compression and reconstruction at a receiving device is shown, according to one or more embodiments. In particular, FIG. 3B describes the operations that may be performed subsequently to Step 318 of FIG. 3A, i.e., when the keypoints for a second (or other subsequent) target image of the first subject are received from the sending device.

At Step 320, the receiving device may receive, from the first sending device, a set of target image keypoints for a second target image of the first subject. At Step 322, the receiving device may determine, for each of the first plurality of source images, a second set of motion vectors, wherein the second set of motion vectors define a predicted motion between the respective source image and the second target image. At Step 324, the receiving device may determine, for each of the first plurality of source images, a second set of warping operations, wherein the second set of warping operations for each source image are determined based on the second set of motion vectors determined for the respective source image.

Next, at Step 326, the receiving device may apply each determined second set of warping operations to the determined feature space representation of the respective image of the first plurality of source images to generate a second set of warped source image features. At Step 328, the second set of warped source image features may be aggregated (e.g., as described above with respect to Aggregation Module 220) to generate a second set of aggregated features for the second target image. Finally, at Step 330, a reconstructed version of the second target image may be generated (e.g., by a Deep Generative Model, such as generator 216, described above) based on the second set of aggregated features. As may now be understood, displaying the reconstructed version of the first target image and the reconstructed version of the second target image in sequential order on the receiving device will cause a reconstructed video sequence to begin to play at the receiving device—despite the fact that receiving device will only have been sent keypoint data for each target image in the video sequence (with full image data being sent only for the plurality of source images).

Figure 3C:
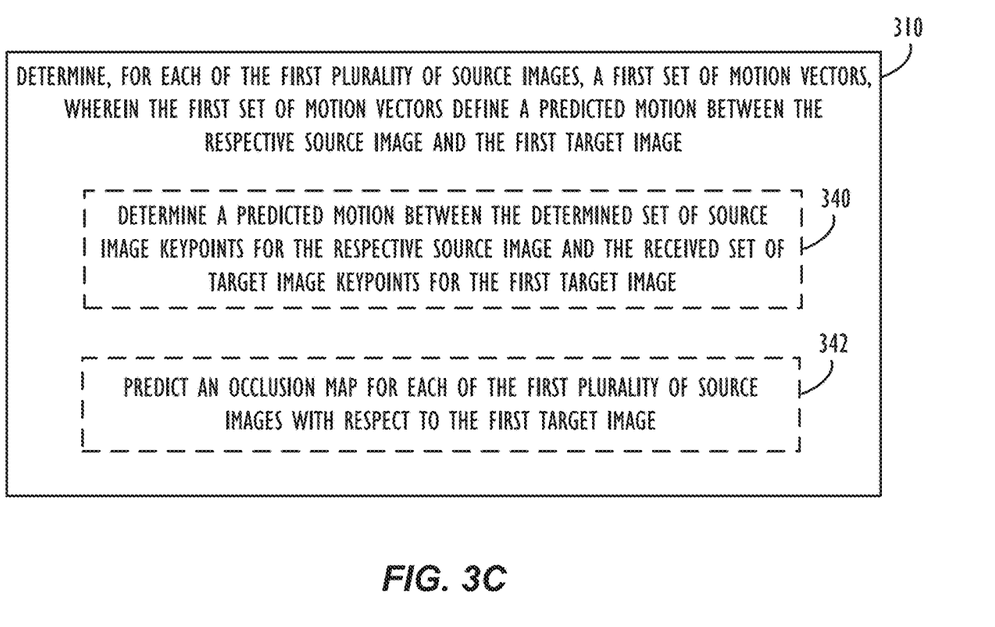

Referring now to FIG. 3C, a flow chart illustrating additional details for step 310 of method 300 of performing multi-image neural video compression and reconstruction at a receiving device is shown, according to one or more embodiments. In some embodiments, at Step 340, determining the first set of motion vectors for each of the first plurality of source images may further comprise determining a predicted motion between the determined set of source image keypoints for the respective source image and the received set of target image keypoints for the first target image. In other words, using just the keypoints to determine the motion vectors for a given source image results in a coarse flow field, which requires less data to transmit and is more efficient to process than a dense flow field, while still providing enough data to reconstruct the target image with sufficient detail.

In other embodiments, at Step 342, the process of determining the first set of motion vectors for each of the first plurality of source images may further comprise predicting an occlusion map for each of the first plurality of source images with respect to the first target image. As described above, the presence of predicted occlusions may be used to deemphasize or discard certain features from certain of the source images during the feature aggregation process, i.e., if the features in a particular portion of a source image reflect the presence of an occluded region in the respective source image, then such features are unlikely to lend useful information to the process of reconstructing the target image on the receiving device.

Figure 3D:
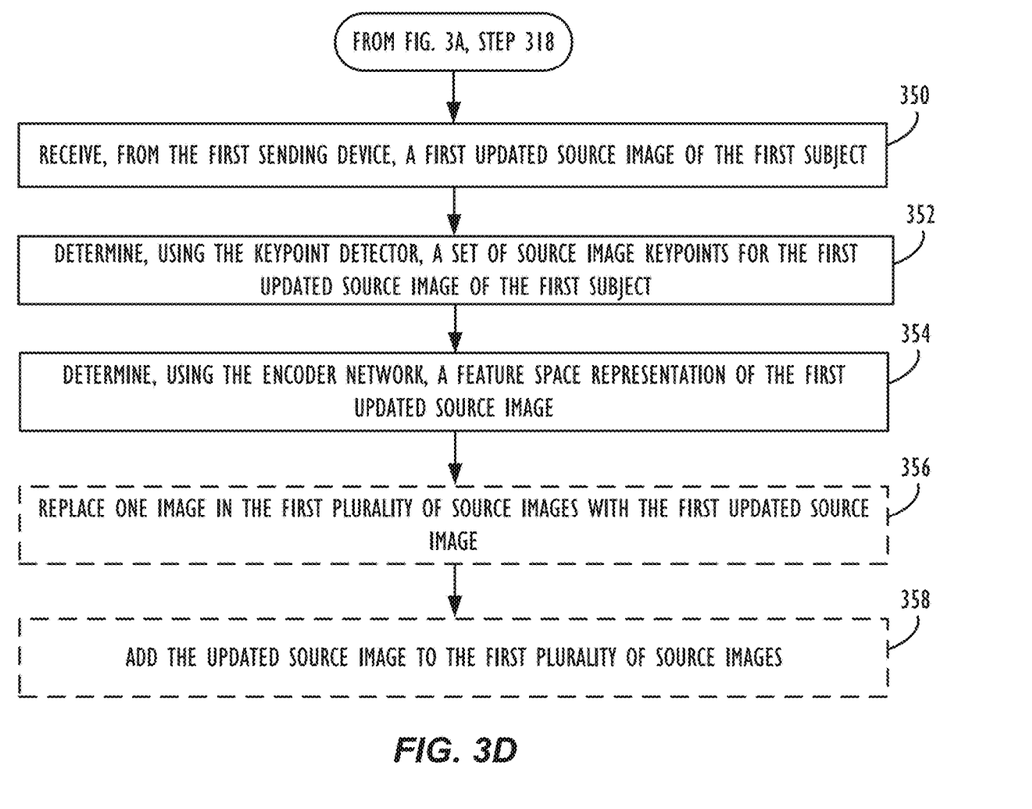

Referring now to FIG. 3D, a flow chart illustrating additional details for method 300 of performing multi-image neural video compression and reconstruction at a receiving device is shown, according to one or more embodiments. In particular, FIG. 3D describes the operations that may be performed subsequent to Step 318 of FIG. 3A, i.e., when updated source image(s) of the first subject are received from the sending device.

At Step 350, the receiving device may receive, from the first sending device, a first updated source image of the first subject. At Step 352, the receiving device may determine, using the keypoint detector, a set of source image keypoints for the first updated source image of the first subject. At Step 354, the receiving device may determine, using the encoder network, a feature space representation of the first updated source image. As described above, Steps 352/354 need only be performed once for each new updated source image of the first subject received from the first sending device. These additional processing costs of Steps 352/354 are able to be amortized over streams of many hundreds or thousands of streamed video frames, meaning that their impact in terms of additional processing resources required at the receiving device essentially goes to zero asymptotically over the duration of a videoconferencing call of any length longer than a few seconds.

In some embodiments, at Step 356, one image in the first plurality of source images may be replaced with the first updated source image. In other words, if there were initially 'n' characterized source images stored at the receiving device prior to Step 356, there would still be 'n' characterized source images stored at the receiving device after Step 356. In some embodiments, a source image in the first plurality of source images may be replaced at random with the first updated source image. In other embodiments, one of the source images in the first plurality of source images that is already the most similar (e.g., in terms of a Euclidean distance between respective landmark vectors) to another image in the first plurality of source images may be the image that is replaced with the first updated source image. In still other embodiments, the sending device may indicate to the receiving device which source image from the first plurality of source images is to be replaced.

In some embodiments, at Step 358, the first updated source image may be added to the first plurality of source images. In other words, if there were initially 'n' stored and characterized source images stored at the receiving device prior to Step 358, there would still be 'n+1' stored and characterized source images stored at the receiving device after Step 358. In still other embodiments, a combination of Steps 356 and 358 may be employed, e.g., adding new updated source image views to the first plurality of source images up to a determined maximum limit, and then replacing an image in the first plurality of source images with each subsequently-received updated source image, e.g., according to the techniques described above with reference to Step 356.

Figure 4:
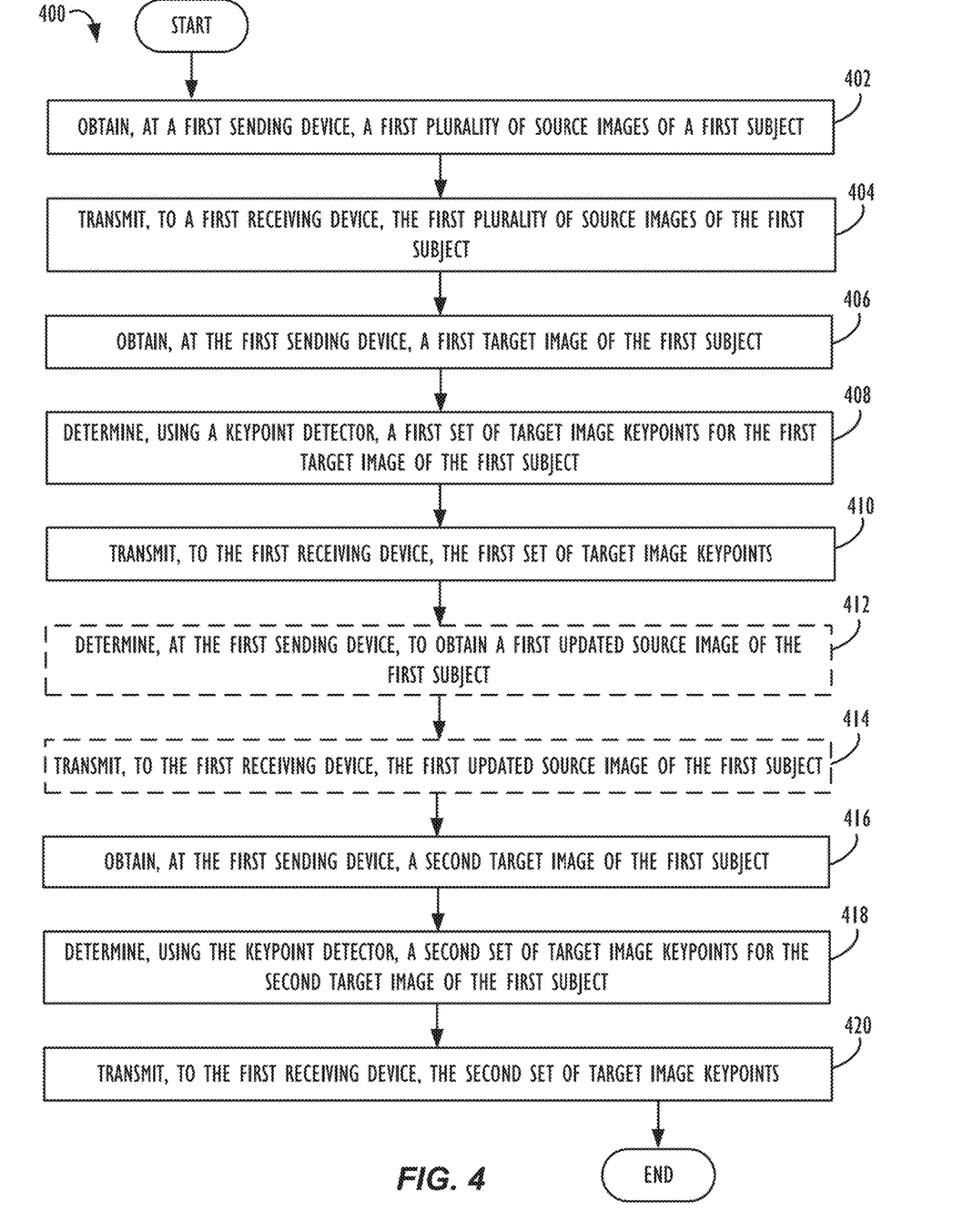
FIG. 4 is a flow chart illustrating a method of performing multi-image neural video compression at a sending device, according to one or more embodiments.

Turning now to FIG. 4, a flow chart illustrating a method 400 of performing multi-image neural video compression at a sending device is shown, according to one or more embodiments. Method 400 may begin at Step 402 by an electronic device (e.g., referred to in the context of FIG. 4 as a "sending device") obtaining a first plurality of source images of a first subject. As described above, the first plurality of source images of a first subject may, in some instances, each comprise a distinct view of the first subject. In some embodiments, the various images comprising the first plurality of source images may be selected randomly from a batch or stream of captured video images of a subject (referred to herein as a "random sampling" or "RS" approach). In other embodiments, a "furthest point sampling" or "FPS" approach based on facial landmarks may be used to select the first plurality of source images. For example, according to an FPS approach, additional images to include in the first plurality of source images may be determined by the sending device by iteratively selecting an image whose landmark vector maximizes the minimal Euclidean distance to the landmark vectors corresponding to the previously selected images in the first plurality of source images, thereby ensuring source images covering a wider array of views of the face of the first subject. In still other embodiments, the images comprising the first plurality of source images may be obtained as part of a user enrollment process, e.g., to a videoconferencing application, wherein multiple predetermined views of the first subject's face (e.g., a set of canonical views/expressions that are commonly portrayed by a user's face during a videoconference call) are requested and captured prior to initiating a videoconference with another user.

Next, at Step 404, the first sending device may transmit, to a first receiving device, the first plurality of source images of the first subject. Next, at Step 406, the first sending device may obtain a first target image of the first subject (e.g., the first image of a video steam of images that it is to be encoded using the present techniques and transmitted to a receiving device). At Step 408, the first sending device may determine, using a keypoint detector, e.g., a learned keypoint detector model, a first set of target image keypoints for the first target image of the first subject. As described above, according to the present techniques, bandwidth savings may be obtained by sending a limited number of keypoints representing the target image (e.g., 10 to 20 keypoints, which may, e.g., be represented as 16-bit floating values), rather than the entirety of the image data comprising the target image. In still other embodiments, the number of keypoints used per frame may be adaptive and/or leverage entropy encoding. At Step 410, the first sending device may then transmit, to the first receiving device, the determined first set of target image keypoints.

According to some embodiments, at Step 412, the first sending device may optionally determine there is a need to obtain a first updated source image of the first subject (e.g., in the event that the first subject exhibits a new facial expression or view, puts on a new accessory, or that the lighting and/or composition of the background in the first subject's scene changes substantially, etc.). As described above, in some embodiments, the first sending device may select the updated source images randomly from among a batch in a stream of captured video images of a subject (i.e., a "RS" approach). In other embodiments, a "furthest point sampling" or "FPS" approach based on facial landmarks may be used to select the updated images to include in the first plurality of source images, e.g., out of a given batch of obtained video images, select the image that is the most dissimilar to each of the already-obtained first plurality of source images to add (or replace) to the first plurality of source images. At Step 414, the first sending device may then optionally transmit, to the first receiving device, the first updated source image of the first subject. As may be understood, upon receipt, the first receiving device may perform the Steps detailed above with reference to FIG. 3D to add and/or update the first plurality of source images whose feature space representations are stored at the receiving device, as needed.

Next, at Steps 416/418/420, the first sending device may repeat analogous steps to Steps 406/408/410 described above, i.e., to process and transmit the necessary information to the first receiving device for subsequently-obtained target images of the first subject. In particular, at Step 416, the first sending device may obtain a second target image of the first subject (e.g., an image captured subsequently to the first image of a video steam of images referred to at Step 406, above). At Step 418, the first sending device may determine, using the keypoint detector, a second set of target image keypoints for the second target image of the first subject. Finally, at Step 420, the first sending device may transmit, to the first receiving device, the determined second set of target image keypoints. It is to be understood that Steps 416/418/420 may be repeated iteratively, as necessary, for each subsequently-obtained target image at the first sending device, e.g., during the capture of a particular video image sequence.

In some embodiments, it may also be possible to perform a segmentation operation on the obtained video images, e.g., a foreground/background segmentation operation, and compress the two (or more) segments of the obtained video images using different techniques. For example, in one implementation, the foreground of the image (which usually contains the subject face in a videoconferencing call) could be compressed and encoded according to the multi-image neural compression techniques described herein, while the background of the image could be encoded according to more traditional engineered codec methods, such as H.264, or the like.

The same techniques could also be applied to segmenting out multiple foreground subjects in a captured video sequence, compressing each subject's face according to the neural compression techniques described herein, encoding the background using a traditional engineered codec (e.g., H.264), and then recompositing the multiple, neurally-reconstructed faces onto the encoded background at the receiving device.

In still other embodiments, the techniques described herein may also be applied to other image domains wherein the image content lends itself to being well-modeled by a modest number of intelligently-determined keypoints, e.g., full-body dance/exercise training videos, satellite imagery systems, surveillance cameras, etc.

Exemplary Electronic Computing Devices

Figure 5:
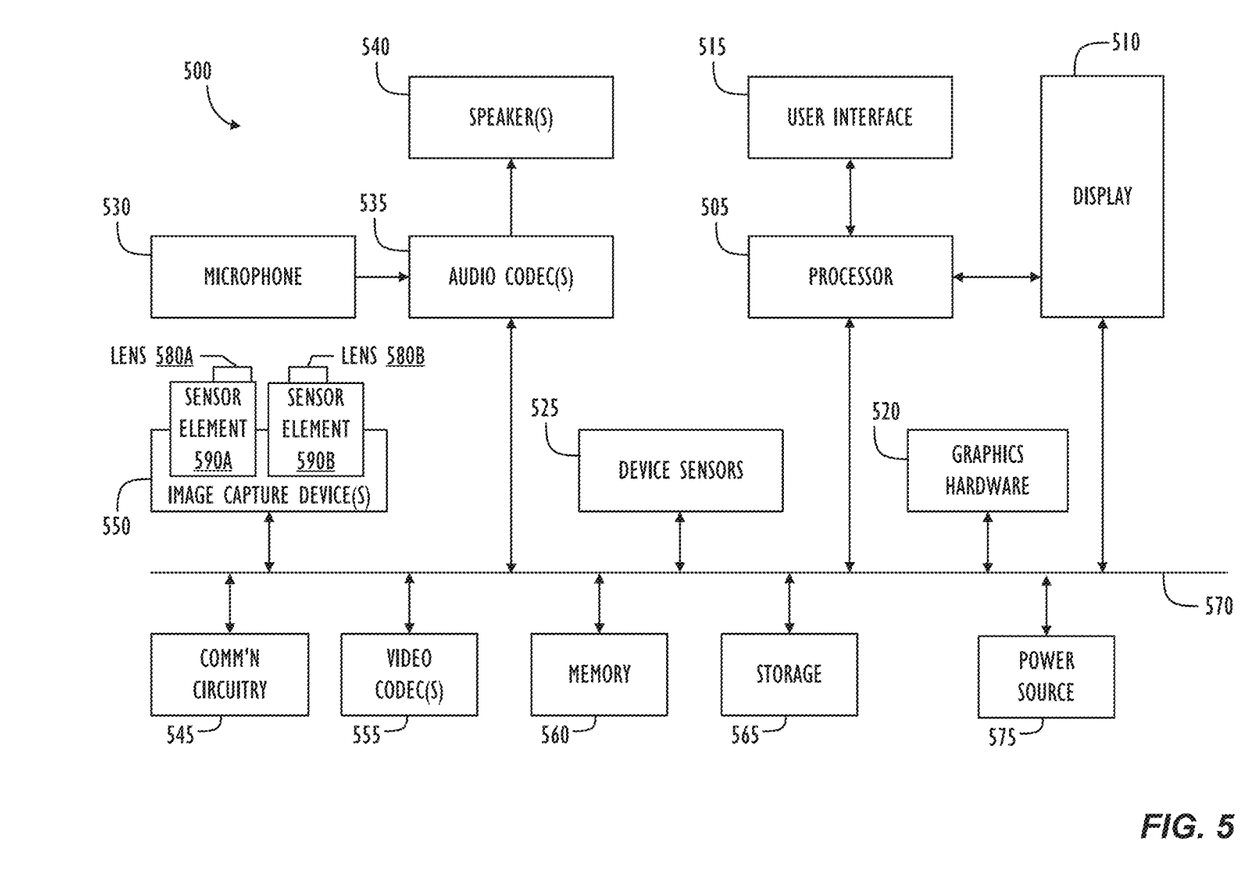
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device(s) 550, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 550 may comprise one or more camera units configured to capture images, e.g., images which may be processed to generate compressed versions of said captured images, e.g., in accordance with this disclosure. Image capture device(s) 550 may include two (or more) lens assemblies 580A and 580B, where each lens assembly may have a separate focal length. For example, lens assembly 580A may have a shorter focal length relative to the focal length of lens assembly 580B. Each lens assembly may have a separate associated sensor element, e.g., sensor elements 590A/590B. Alternatively, two or more lens assemblies may share a common sensor element. Image capture device(s) 550 may capture still and/or video images. Output from image capture device(s) 550 may be processed, at least in part, by video codec(s) 555 and/or processor 505 and/or graphics hardware 520, and/or a dedicated image processing unit or image signal processor incorporated within image capture device(s) 550. Images so captured may be stored in memory 560 and/or storage 565.

Memory 560 may include one or more different types of media used by processor 505, graphics hardware 520, and image capture device(s) 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory; and
one or more processors operatively coupled to the memory, wherein the one or more processors are configured to execute instructions causing the one or more processors to:
receive, from a first sending device, a first plurality of source images of a first subject, wherein each image of the first plurality of source images comprises a distinct view of the first subject;
receive, from the first sending device, a set of target image keypoints for a first target image of the first subject;
determine, using a keypoint detector, a set of source image keypoints for each of the first plurality of source images of the first subject;
determine, using an encoder network, a feature space representation of each of the first plurality of source images;
determine, for each of the first plurality of source images, a first set of motion vectors, wherein the first set of motion vectors define a predicted motion between the respective source image and the first target image, and wherein the determination of the first set of motion vectors for a respective source image is based, at least in part, on the set of target image keypoints for the first target image and the set of source image keypoints for the respective source image;
determine, for each of the first plurality of source images, a first set of warping operations, wherein the first set of warping operations for each source image are determined based on the first set of motion vectors determined for the respective source image;
apply each determined first set of warping operations to the determined feature space representation of the respective image of the first plurality of source images to generate a first set of warped source image features;
aggregate the first set of warped source image features to generate a first set of aggregated features for the first target image; and
generate a reconstructed version of the first target image based on the first set of aggregated features.

2. The device of claim 1, wherein the one or more processors are further configured to execute instructions causing the one or more processors to:
receive, from the first sending device, a set of target image keypoints for a second target image of the first subject;
determine, for each of the first plurality of source images, a second set of motion vectors, wherein the second set of motion vectors define a predicted motion between the respective source image and the second target image;
determine, for each of the first plurality of source images, a second set of warping operations, wherein the second set of warping operations for each source image are determined based on the second set of motion vectors determined for the respective source image;
apply each determined second set of warping operations to the determined feature space representation of the respective image of the first plurality of source images to generate a second set of warped source image features;
aggregate the second set of warped source image features to generate a second set of aggregated features for the second target image; and
generate a reconstructed version of the second target image based on the second set of aggregated features.

3. The device of claim 1, wherein the keypoint detector further comprises an end-to-end trained keypoint detector neural network.

4. The device of claim 1, wherein the instructions to determine, for each of the first plurality of source images, a first set of motion vectors further comprise instructions to:
determine a predicted motion between the determined set of source image keypoints for the respective source image and the received set of target image keypoints for the first target image.

5. The device of claim 1, wherein the instructions to determine, for each of the first plurality of source images, a first set of motion vectors further comprise instructions to:
predict an occlusion map for each of the first plurality of source images with respect to the first target image.

6. The device of claim 1, wherein the one or more processors are further configured to execute instructions causing the one or more processors to:
receive, from the first sending device, a first updated source image of the first subject;
determine, using the keypoint detector, a set of source image keypoints for the first updated source image of the first subject; and
determine, using the encoder network, a feature space representation of the first updated source image.

7. The device of claim 6, wherein the one or more processors are further configured to execute instructions causing the one or more processors to perform one of the following operations:
replace one image in the first plurality of source images with the first updated source image; or
add the updated source image to the first plurality of source images.

8. The device of claim 6, wherein the first updated source image of the first subject is determined at the first sending device as a result of:
a random sampling (RS) operation applied across a batch or stream of images captured at the first sending device; or
a furthest point sampling (FPS) operation applied across a batch or stream of images captured at the first sending device.

9. The device of claim 1, wherein the instructions to aggregate the first set of warped source image features to generate a first set of aggregated features for the first target image further comprise instructions to:
aggregate the first set of warped source image features using a pooling mechanism or a self-attention mechanism.

10. The device of claim 1, wherein the instructions to generate a reconstructed version of the first target image based on the first set of aggregated features further comprise instructions to:
generate a reconstructed version of the first target image based on the first set of aggregated features using a deep generative model (DGM).

11. A non-transitory computer-readable medium comprising computer readable instructions executable by one or more processors to:
  receive, from a first sending device, a first plurality of source images of a first subject, wherein each image of the first plurality of source images comprises a distinct view of the first subject;
  receive, from the first sending device, a set of target image keypoints for a first target image of the first subject;
  determine, using a keypoint detector, a set of source image keypoints for each of the first plurality of source images of the first subject;
  determine, using an encoder network, a feature space representation of each of the first plurality of source images;
  determine, for each of the first plurality of source images, a first set of motion vectors, wherein the first set of motion vectors define a predicted motion between the respective source image and the first target image, and wherein the determination of the first set of motion vectors for a respective source image is based, at least in part, on the set of target image keypoints for the first target image and the set of source image keypoints for the respective source image;
  determine, for each of the first plurality of source images, a first set of warping operations, wherein the first set of warping operations for each source image are determined based on the first set of motion vectors determined for the respective source image;
  apply each determined first set of warping operations to the determined feature space representation of the respective image of the first plurality of source images to generate a first set of warped source image features;
  aggregate the first set of warped source image features to generate a first set of aggregated features for the first target image; and
  generate a reconstructed version of the first target image based on the first set of aggregated features.

12. The non-transitory computer-readable medium of claim 11, wherein the instructions to determine, for each of the first plurality of source images, a first set of motion vectors further comprise instructions to:
  determine a predicted motion between the determined set of source image keypoints for the respective source image and the received set of target image keypoints for the first target image.

13. The non-transitory computer-readable medium of claim 11, wherein the instructions to determine, for each of the first plurality of source images, a first set of motion vectors further comprise instructions to:
  predict an occlusion map for each of the first plurality of source images with respect to the first target image.

14. The non-transitory computer-readable medium of claim 11, wherein the one or more processors are further configured to execute instructions causing the one or more processors to:
  receive, from the first sending device, a first updated source image of the first subject;
  determine, using the keypoint detector, a set of source image keypoints for the first updated source image of the first subject; and
  determine, using the encoder network, a feature space representation of the first updated source image.

15. The non-transitory computer-readable medium of claim 14, wherein the one or more processors are further configured to execute instructions causing the one or more processors to perform one of the following operations:
  replace one image in the first plurality of source images with the first updated source image; or
  add the updated source image to the first plurality of source image.

16. The non-transitory computer-readable medium of claim 14, wherein the first updated source image of the first subject is determined at the first sending device as a result of:
  a random sampling (RS) operation applied across a batch or stream of images captured at the first sending device; or
  a furthest point sampling (FPS) operation applied across a batch or stream of images captured at the first sending device.

17. A method, comprising:
  receiving, from a first sending device, a first plurality of source images of a first subject, wherein each image of the first plurality of source images comprises a distinct view of the first subject;
  receiving, from the first sending device, a set of target image keypoints for a first target image of the first subject;
  determining, using a keypoint detector, a set of source image keypoints for each of the first plurality of source images of the first subject;
  determining, using an encoder network, a feature space representation of each of the first plurality of source images;
  determining, for each of the first plurality of source images, a first set of motion vectors, wherein the first set of motion vectors define a predicted motion between the respective source image and the first target image, and wherein the determination of the first set of motion vectors for a respective source image is based, at least in part, on the set of target image keypoints for the first target image and the set of source image keypoints for the respective source image;
  determining, for each of the first plurality of source images, a first set of warping operations, wherein the first set of warping operations for each source image are determined based on the first set of motion vectors determined for the respective source image;
  applying each determined first set of warping operations to the determined feature space representation of the respective image of the first plurality of source images to generate a first set of warped source image features;
  aggregating the first set of warped source image features to generate a first set of aggregated features for the first target image; and
  generating a reconstructed version of the first target image based on the first set of aggregated features.

18. The method of claim 17, further comprising:
  receiving, from the first sending device, a first updated source image of the first subject;
  determining, using the keypoint detector, a set of source image keypoints for the first updated source image of the first subject; and
  determining, using the encoder network, a feature space representation of the first updated source image.

19. The method of claim 17, further comprising:
  replacing one image in the first plurality of source images with the first updated source image; or
  adding the updated source image to the first plurality of source images.

20. The method of claim 17, wherein the first updated source image of the first subject is determined at the first sending device as a result of:

applying a random sampling (RS) operation across a batch or stream of images captured at the first sending device; or applying a furthest point sampling (FPS) operation across a batch or stream of images captured at the first sending device.

\* \* \* \* \*